United States Patent [19]

Emmons et al.

[11] 4,253,397
[45] Mar. 3, 1981

[54] METHOD OF PRINTING WITH LITHOGRAPHIC INK OF REDUCED VOLATILE SOLVENT CONTENT FOR REDUCING ATMOSPHERIC POLLUTION

[75] Inventors: William D. Emmons, Huntingdon Valley; Peter R. Sperry, Doylestown; Fred A. Kaplan, North Wales, all of Pa.

[73] Assignee: Rohm and Haas Company, Philadelphia, Pa.

[21] Appl. No.: 87,840

[22] Filed: Oct. 24, 1979

Related U.S. Application Data

[62] Division of Ser. No. 14,676, Feb. 23, 1979.

[51] Int. Cl.$^3$ .................. C8D 11/06; B41M 1/00; C08K 5/11
[52] U.S. Cl. .................. 101/450.1; 106/29; 106/30; 260/31.2 R; 260/DIG. 38; 260/23 P
[58] Field of Search .................. 101/450; 106/29, 30; 260/31.2 R, DIG. 38, 23 P

[56] References Cited

U.S. PATENT DOCUMENTS

| | | | |
|---|---|---|---|
| 3,284,385 | 11/1966 | D'Alelio | 260/23 |
| 3,665,502 | 5/1972 | Erickson | 106/29 |
| 3,881,942 | 5/1975 | Buckwalter | 106/30 |
| 4,146,519 | 3/1979 | D'Heim | 260/23 AR |

*Primary Examiner*—Morton Foelak

[57] ABSTRACT

Disclosed are inks containing compounds of the formula:

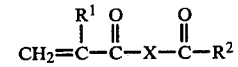

where
—$R^1$ is —H or —$CH_3$
—$R^2$ is an aliphatic, preferably linear hydrocarbyl, radical having 11–23 carbon atoms and containing at least one olefinic double bond, or mixtures thereof, -$R^2$ being free of terminal double bonds, and
—X— is either (a) —$OR^3O$— in which $R^3$ is an aliphatic or cycloaliphatic hydrocarbon residue containing from 2 to 10 carbon atoms, or (b) —$O(CH_2CH-R^4O)_n$— where $R^4$ is —H or —$CH_3$ and n is an integer of from 2–10, or mixtures thereof.

Preferably, —X— is —$OR^3O$— wherein $R^3$ is —$CH_2CH_2$— or

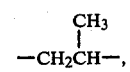

—$R^1$ is —$CH_3$, and —$R^2$ is a mixture of hydrocarbyl moieties derived from drying oils and is at least in part polyunsaturated, and more preferably, predominantly so. The products are oxidatively curable reactive diluents of exceptionally low viscosity and low volatility which are useful for the preparation of high solids lithographic inks to reduce atmospheric pollution caused by volatile non-reactive solvents. In addition to compounds of the given formula, other esters of drying oil fatty acids with various addition-polymerizable olefinically unsaturated hydroxyl-containing compounds are disclosed. Another way of describing the preferred reactive diluents of the invention is to define them as the mixed esters of a polyol with (1) mixed material drying oil fatty acids and (2) an α,β-ethylenically unsaturated acid.

13 Claims, No Drawings

METHOD OF PRINTING WITH LITHOGRAPHIC INK OF REDUCED VOLATILE SOLVENT CONTENT FOR REDUCING ATMOSPHERIC POLLUTION

This is a division of application Ser. No. 14,676 filed Feb. 23, 1979, pending.

BACKGROUND OF THE INVENTION:

Lithography is usually reserved for high quality printing, such as advertising, books, publications, and packaging. Lithographic inks are divided basically into two types; so-called heat-set and quick-set.

Lithographic ink users consider that suitable resins and components for heat-set inks and quick-set inks should have the listed qualities:
(1) Magie Oil solvent (aliphatic hydrocarbon) solubility
(2) Fast-drying without excessive energy input
(3) Compatibility with resinous ink vehicles
(4) Low odor
(5) Pigment dispersing and wetting capability
(6) Good transfer properties
(7) Stability on the press (antiskinning and viscosity stability)
(8) Water immisciblity
(9) Gloss
(10) Low tendency to attack rubber printing rolls and blankets
(11) Resistance to rubbing.

Lithographic inks of commerce are high viscosity paste inks comprised mainly of colored pigment, binder resin, or resinous vehicle and solvent, usually high boiling aliphatic petroleum cuts known as "ink oils." Solvent content is from about 30% to 50% by weight. Minor additives include natural and synthetic waxes, metal salt driers, antioxidants, antiskinning agents, "sweetening" stronger solvents such as tridecyl alcohol (U.S. Pat. No. 3,257,344), and gelling or bodying agents such as aluminum ortho esters (U.S. Pat. No. 3,531,302). The resins are usually high melting (>60° C.) so as to yield hard, non-offsetting, block-resistant and rub-resistant films. Suitable resins are hydrocarbon polymers, rosin derivatives, alkyds, acrylics, styrene-acrylics, and other conventional binders.

"Quick-set" lithographic inks frequently use the higher boiling of the ink oils, such as Magie Oil 535 as solvent and dry at ambient temperature by a combination of evaporation, wicking into paper, and precipitation via design for marginal resin compatibility. "Heat-set" types use lower boiling solvent such as Magie Oil 470 to achieve faster setting, and are dried at very high speeds in ovens, usually gas fired. These "oils" consist essentially of aliphatic hydrocarbons and are described below.

In the heat-set area especially, the printing industry is under increasing regulatory agency pressure to drastically reduce polluting solvent emission. Ink solvent emission is particularly noxious because the high boiling point ink oil solvents required for long term viscosity stability on the press yield dense smoke plumes from the stacks.

U.S. Pat. Nos. 3,766,110 and 3,776,867 disclose solvent-free printing inks based on acid catalyzed urea or melamine formaldehyde resins with hydroxyl functionality. They are certainly free of solvent emission but do emit noxious and toxic formaldehyde on cure. Moreover, it is well known that such systems have limited shelf like, especially with the strong acid catalysts required for acceptably low cure temperatures.

The reactive diluents useful in the present invention are known compounds. For example, U.S. Pat. No. 3,284,385 (Nov. 8, 1966) to G. F. D'Alelio (assigned to Dal Mon Research Corp.), discloses the preparation and anionic polymerization of methacryloxyethyl linoleate, acryloxyethyl linoleate, and drying oil fatty acid analogs. Also, U.S. Pat. No. 2,160,532 (May 30, 1939) to Barrett and Strain (assigned to duPont) relates to the preparation of monomeric mixed esters of polyhydric alcohols such as diols, glycols, etc., with methacrylic acid and drying oil acids. Specifically disclosed are soybean oil diglyceride monomethacrylate, soybean oil monoglyceride dimethacrylate, glycol laurate methacrylate (lauryl alcohol is a saturated alcohol), and related materials. These are used in coatings with peroxide initiators or metal salt driers or with other resins. U.S. Pat. No. 2,593,444 (Apr. 22, 1952) to Harrison (assigned to General Mills), shows esters of acrylic or methacrylic acid and alcohols derived from drying oils. The use of heat settable inks containing drying oil functionality is also known. See for example Chem. Abstr. 82, 141786R.

SUMMARY OF THE INVENTION

The present invention is in the discovery that certain oxidatively curable liquid reactive diluents of low viscosity and low volatility are useful for the preparation of high solids lithographic inks, of exceptional storage stability, to reduce atmospheric pollution by volatile solvents, and furthermore, to conserve such solvents, which saves valuable raw materials. By "high solids" is meant the materials which remain in the cured ink; thus, the reactive diluent is calculated as part of the "solids".

DETAILED DESCRIPTION

The ink compositions of the invention contain liquid reactive diluents preferably of the formula:

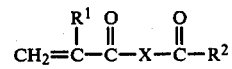

where
—$R^1$ is —H or —$CH_3$
—$R^2$ is an aliphatic radical, preferably linear hydrocarbyl, having 11-23 carbon atoms and containing at least one olefinic double bond, or mixtures thereof, —$R^2$ being free of terminal double bonds, and —X— is either —$OR^3O$— in which $R^3$ is an aliphatic or cycloaliphatic hydrocarbon residue containing from 2 to 10 carbon atoms, or —$O(CH_2CHR^4O)_n$— where $R^4$ is —H or —$CH_3$ and n is an integer from 2–10, or mixtures thereof.

Preferably, —X— is —$OR^3O$— in which $R^3$ is —$CH_2CH_2$— or

and —$R^2$ is linear hydrocarbyl, is at least in part polyunsaturated, more preferably predominantly polyunsaturated, and is a mixture of moieties derived from one or more drying oils.

While those compounds of the given formula are preferred, as will be explained hereinafter, not only derivatives of acrylic or methacrylic acid are useful, but also compounds based on α,β-olefinically unsaturated hydroxyalkyl monocarboxylic or polycarboxylic acids, and hydroxyalkyl vinyl sulfides and ethers, and the like, are also included. Thus, in its broader aspects, the reactive diluent may be considered to be the drying oil fatty acid ester of any addition polymerizable olefinically unsaturated hydroxyl-containing compound. Thus, one way of making the reactive diluents is by esterification of an addition polymerizable olefinically unsaturated hydroxy-containing compound with drying oil fatty acids. Suitable hydroxy-containing compounds include the following materials, which can be used to prepare reactive diluents of the formula given above, directed to the acrylic acid or methacrylic acid derivatives, as well as those which are less preferred but are also useful: 2-hydroxyethyl acrylate, methyl α-(hydroxymethyl)-acrylate, ethyl α-(hydroxymethyl) acrylate, butyl (2-hydroxyethyl) acrylate, 2-hydroxpropyl acrylate or methacrylate, 3-hydroxypropyl acrylate or methacrylate, methyl α-(2-hydroxypropyl) acrylate, ethyl α-(3-hydroxypropyl)-acrylate, 4-hydroxybutyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxypheptyl crotonate, 10-hydroxydecyl crotonate, di(2-hydroxyethyl)maleate, di(4-hydroxybutyl)maleate, di(6-hydroxyhexyl)maleate, di(9-hydroxynonyl)maleate, di(10-hydroxydecyl)maleate, di(2-hydroxyethyl)-fumarate, di(4-hydroxybutyl)fumarate, di(6-hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like. such as 2,3-dihydroxypropyl acrylate, 3,5-dihydroxyamyl crotonate, 6,10-dihydroxydecyl methacrylate, di-2,6-dihydroxyhexyl maleate, di-2-chloro 7-hydroxyheptyl fumarate and the like. In all cases, the hydroxyl of each hydroxyalkyl groups is at least two carbon atoms removed from the carbon atom of the adjacent —COO— radical in the ester.

A broader definition of the diluents useful in the invention is that they are esters of drying oil fatty acids with hydroxyalkyl esters of α,β-olefinically unsaturated, addition polymerizable, monocarboxylic or polycarboxylic acids. Another way of describing the preferred reactive diluents of the invention is to define them as the mixed esters of a polyol with (1) mixed drying oil fatty acids and (2) addition-polymerizable, -ethylenically unsaturated acids. In addition, olefinically unsaturated hydroxyalkyl vinyl sulfides and vinyl ethers may be used to form esters with the drying oil fatty acids to give useful reactive diluents.

Examples of the vinyl sulfides and vinyl ethers include:
β-Hydroxyethyl vinyl sulfide
β-Hydroxyethyl vinyl ether
β-Hydroxypropyl vinyl sulfide
5-Hydroxypentyl vinyl ether
6-Hydroxyhexyl vinyl ether
8-Hydroxyoctyl vinyl ether
10-Hydroxydecyl vinyl ether
Diethyleneglycol monovinyl ether Kirk-Othmer, "Encyclopedia of Chemical Technology", Volume 8, pages 395-398, Interscience, New York (1952), discusses the mechanism of oxidative drying. It is indicated that peroxides are formed, that conjugation of the double bonds in the oils occurs at least to some extent, followed by crosslinking of the oils in the film. It is believed that such peroxides cause addition polymerization of the α,β-ethylenic unsaturation in the reactive diluents of the invention. Thus, while it is important that some polyunsaturated drying oil acids be present in order for peroxides to be formed, once the peroxides are present to act as free radical initiators for the addition polymerization, the adducts of, e.g., hydroxyethyl methacrylate with any of oleic, palmitic, or stearic acids are believed to undergo addition polymerization. This theory is confirmed by I. R. spectroscopic analysis, which shows no residual methacrylate unsaturation, for instance, in the fully cured ink. Of course, it is possible to add a conventional free radical initiator, but such material is not needed.

The reactive diluents of the present invention are highly compatible with common ink resins and may be used to replace some or all of the volatile solvent. They are virtually non-volatile at time/temperature exposures used in heat setting, and cure in air with transition metal driers or siccatives such as cobalt and manganese salts to become a part of the film forming mass. Exceptional shelf stability of inks containing metal drier salts are obtained with low levels of volatile inhibitors such as oximes. Further advantages of the materials are excellent pigment wetting and high ink gloss, and low tendency to swell Neoprene and Buna N press blankets and rollers used extensively in the industry. The reactive diluent makes up from 5% to 50% of the combined weights of the reactive diluent and binder resin.

While the sole diluent is preferably the reactive one, it can be mixed with conventional volatile solvents. Such conventional solvents have a Kauri-butanol (KB) value of between 18 and 31, preferably between 21 and 28. Typical products have a minimum of about 70% paraffins, i.e., consisting essentially of saturated aliphatic or cycloaliphatic hydrocarbons, with no more than about 25% aromatics, on a weight basis. They may contain small percentages of aliphatic olefins, i.e., less than 10%, and preferably less than about 5%. The average molecular weight is between 160 and 270. They have an initial boiling point of between about 400° and about 600° F., with a final boiling point of between about 475° and 700° F. The preferred initial boiling point is between about 400 and 500° F. with a final boiling point of between 475 and 600° F. The aniline point is between about 150° F. and 220° F. Suitable products are obtained from Magie Bros. Oil Company, 9101 Fullerton Avenue, Franklin Park, Illinois 60131. Suitable products are sold as Magie Oil 400, 405, 415, 440, Deo 440, 470, 4600, 500, Deo 520, 535, 5300, 590, 625, and Deo 620. Other boiling ranges are usable provided the KB value is as specified. The kauri-butanol value is the number of milliliters of the hydrocarbon or other liquid required to cause cloudiness when added to 20 g of a solution in which there is 100 g of kauri gum and 500 g of butyl alcohol. This is basically ASTM method D-1133, Volume 20.

Typical ink colorants include carbon black, phthalocyanine blue, titanium dioxide, lithol rubine reds, ultramarine blue, hansa yellow, and the like. A suitable pigment:binder resin plus reactive diluent ratio is between 0.01:1 and 2:1, on a weight basis.

Typically, lithographic inks are soft to medium to heavy pastes, having a viscosity of from 5,000 cps to 500,000 cps at 25° C.

After absorption by the substrate such as paper and evaporation of volatile solvent, if used, the ink is cured by oxidative drying.

Other substrates than paper are useful for making printed articles. Such materials include plastics such as polyolefins, metals, other cellulosic materials, etc.

The solid binder vehicle is also conventional. Fossil resins such as gilsonite, rosin esters of glycerol or pentaerythritol, limed rosin, maleic modified rosin, alkyds, phenolic resins, hydrocarbon resins, acrylic polymers, etc., are useful. Among the conventional ink resins are rosin-derived resins such as the phthalate esters of hydroabietyl alcohol, wood rosin, polymerized rosin, maleic-modified rosin, and phenolic modified rosin. Also useful are aromatic and aliphatic hydrocarbon resins, and copolymers such as vinyl toluene and α-methyl styrene. These are available from the Resins Division of Hercules Inc., Wilmington, Del. 19859. Acrylics such as shown in U.S. Patent application Ser. No. 5,930, filed Jan. 24, 1979, and Belgian Pat. No. 863,624, to the assignee of the present application, are useful. They disclose a low molecular weight (Mw 1,000–15,000) acrylic polymer of 1–40% by weight of isobornyl methacrylate and one or more of isobutyl methacrylate, tert-butylaminoethyl acrylate, methacrylic acid, dimethylaminoethyl methacrylate, dimethylaminoethyl acrylate, acrylic acid, maleic anhydride, itaconic acid, oxazolidinyl ethyl methacrylate, and styrene. Other suitable comonomers include dicyclopentenyl methacrylate and acrylate, dicyclopentenylethoxy methacrylate and acrylate, butyl methacrylate, dicyclopentenylneopentoxy methacrylate and acrylate, isobornyl acrylate, and other vinyl aromatics such as α-chlorostyrene, α-methyl styrene, t-butyl styrene, and vinyl toluene. Typically, a small amount of one or more of the carboxylic acid monomers such as acrylic acid or methacrylic acid is included. Typical polymers are isobutyl methacrylate/isobornyl methacrylate/methacrylic acid in the ratios 66/29/2, isobutyl methacrylate/isobornyl methacrylate/t-butyl aminoethyl methacrylate/methacrylic acid in the ratios of 68/28/3/1, isobutyl methacrylate/vinyl toluene/methacrylic acid in the ratios of 29/69/2, s-butyl methacrylate/methacrylic acid in the ratio of 98/2, and the like.

The reactive diluents may be prepared by any of the conventional methods taught by U.S. Pat. No. 3,284,385 or U.S. Pat. No. 2,160,532. As an alternative to esterifying e.g., hydroxyethyl methacrylate with the fatty acids, the fatty acids may first be converted to the monoester of a glycol, followed by esterification with e.g., methacrylic acid or transesterification with methyl methacrylate.

This alternative method of preparing the reactive diluent entails a two-stage esterification in which the fatty acid is first reacted with a large excess of glycol and the resultant product then esterified with e.g., acrylic or methacrylic acid. An excess of glycol is required in order to prevent the formation of the bis (fatty acid) ester, $R^2CO_2R^3O_2CR^3$. The reverse sequence, esterification of the polymerizable acid first, is preferred, since such products are commercially available. Transesterifications of lower alkyl esters of the acids may be employed as well at each stage of either process. The alternative procedure is illustrated by the equations:

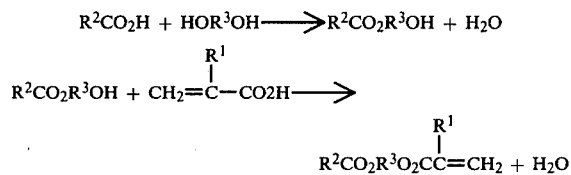

It thus is to be understood that when reference is made, e.g., to an ester of the drying oil acids with an unsaturated hydroxyl-containing acid, esters made by this alternative method are included.

Typical examples of unsaturated acids useful in the invention, particularly as naturally occuring mixtures, are:

9,12-linoleic acid,

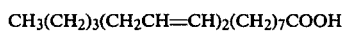

Linolenic acid,

Arachidonic acid,
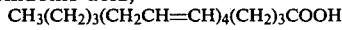

Licanic acid,

Parinaric acid,

Eleostearic acid,

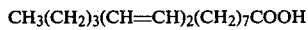

Palmitoleic acid,

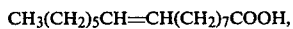

Oleic acid,

Petroselinic acid,

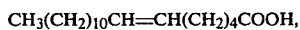

Vaccenic acid,

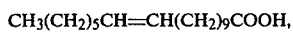

Cetoleic acid,

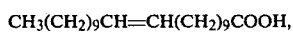

Erucic acid,

The polyunsaturated drying oil acid moieties are preferred. These acids are obtained by the well known catalytic hydrolysis of the corresponding natural or synthetic fatty esters. Of course, mixtures of the acids are commonly used, because there is no need to separate the acids obtained from a given drying oil. Mixtures of acids from more than one drying oil are also useful.

It may be noted that in these mono-olefinic and polyolefinic $R^2COOH$ groups, there is no terminal $CH_2=C<$ structure. Instead, the terminal group is a $-CH_3$ group. Moreover, the first double bond in the structure is removed from the oxygen atom of its esters by at least 4 carbon atoms and by as many as 14 carbon atoms, and therefore are not activated by the ester structure. Furthermore, the first double bonds are removed by at least 1 carbon atom from the terminal $-CH_3$ group which is not an activating group. Finally, there may be 1 to 4 or more $-CH=CH-$ groups in the fatty acid residue.

Table 1 gives the percentage composition of the fatty acids in a number of drying oils, which on hydrolysis produce relative proportions of the corresponding acids.

TABLE 1

| Oil | Percent of Total Fatty Acid | | | | | | |
|---|---|---|---|---|---|---|---|
| | Palmitic | Stearic | Oleic | Linoleic | Linolenic | Liocanic | Eleostearic |
| Soybean | 6.5 | 4.2 | 33.6 | 52.6 | 2.3 | — | — |
| Oiticica | 5.0 | 5.0 | 5.9 | 10.0 | — | 74.1 | — |
| Tung | 4.0 | 1.5 | 15.0 | — | — | — | 79.5 |
| Linseed | 5.0 | 3.5 | 5.0 | 61.5 | 25.0 | — | — |
| Perilla | 7.5 | — | 8.0 | 38.0 | 46.5 | — | — |

It will be noted in Table 1 that all of the oils have measurable amounts of compounds having one or more than one double bond in the fatty acid, and therefore, the derived acids have a substantial amount of suitable mono- and poly-unsaturation suitable for the purposes of this invention.

Among the drying oils from which the drying oil fatty acid is derived are linseed, tung, tall, safflower, perilla, soya, dehydrated castor, maleinized or fumarized linseed, oiticica, palm, peanut, corn, walnut, menhaden, dehydrated castor, and cottonseed oils, and similar oils, as well as acids not derived from drying oils and of a synthetic origin, with a carbon chain preferably of about 23 carbon atoms or less and having unsaturation therein which can be caused to air cure in a manner analogous to linseed oil. Preferred sources of the drying oil acids are tung, linseed, safflower, soybean and dehydrated castor oils.

At times it is beneficial to include a polyolefinically unsaturated addition polymerizable crosslinker in the ink along with the reactive diluent. Suitable polyunsaturated copolymerizable cross-linking compounds include: divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, a 1,3-butylene glycol di(meth)acrylate, a trimethylol propane tri(meth)-acrylate, N,N'-ethylenediacrylamide, trivinylbenzene, trivinylnaphthalene, polyvinylanthracenes and the polyallyl and polyvinyl ethers of glycols, glycerol, pentaerythritol, resorcinol and the monothio or dithio derivatives of glycols. The proportion of crosslinker is from 0% to 50%, preferably 0.05% to 30% of the weight of the reactive diluent.

In making the hydroxyl-containing addition polymerizable compound or the drying oil fatty acid monoester of a diol, various diols are useful. These include ethylene glycol, diethylene glycol, triethylene glycol, tetraethylene glycol, propylene glycol, dipropylene glycol, 1,3-butanediol, 1,4-butanediol, 2,3-butanediol, 2-butene-1,4-diol, 1,5-pentanediol (pentanediols), 1,6-hexanediol (hexanediols), heptanediols, 1,8-octanediol (octanediols), nonanediols, decanediols, 2,2,4-trimethyl-1,3-pentanediol, 2,2-diethyl-1,3-butanediol, 2-ethyl-1,4-butanediol, 3,3-diethyl-1,5-pentanediol, 2,2-dimethyl-1,3-propanediol, 2,2-dimethyl-1,3-hexanediol, 2-ethyl-1,3-Hexanediol, 2,2-diethyl-1,3-propanediol, 3-methyl-1,4-pentanediol, 1,2-cyclohexanediol, 1,4-cyclohexanediol (cyclohexanediols), cyclohexanedimethanol, bisphenol A, hydrogenated bisphenol A, etc. or mixtures thereof.

Any of the conventional driers or siccatives, such as the linoleates, naphthenates, and resinates of cobalt, zirconium, manganese, lead, cerium, chromium, iron, nickel, uranium, and zinc are suitable for curing the inks of the invention. Inorganic acid salts can also be used.

The amount of drier, if used, based on the weight of the reactive diluent, can be as low as 0.001% to as high as 3% or more. Good results are often obtained with combinations of driers, such as zinc naphthenate and cobalt naphthenate in quite small amounts, for example, from 0.01% to 0.5% of the zinc naphthenate together with 0.01% to 0.1% cobalt naphthenate. $Co^{++}$ is also useful, alone or with compounds providing $Mn^{++}$, $Zn^{++}$, $Zr^{++}$, or $Pb^{++}$.

The drier may be added to the ink composition prior to storage. If a volatile stabilizer is included in the composition to inhibit or prevent the oxidizing action of the drier, the composition is preferably placed in closed storage containers to prevent volatilization of the stabilizer. The stabilizer may be used in a proportion of 0 to 2% by weight based on the weight of the binder and reactive diluent. The stabilizer is generally a volatile ketone-oxime or aldehyde-oxime. Specific examples are methyl ethyl ketone-oxine, methyl butyl ketone-oxime, 5-methyl-3-heptanone-oxime, cyclohexanone-oxime, and butyraldehyde-oxime. Addition of such inhibitors is not essential to long stability and pot life of the inks. In some cases, antioxidants such as hydroquinone can be included without seriously inhibiting the cure of the ink.

Another method of curing the inks of the invention is by the use of wave energy such as ultraviolet light. In that method, the ink includes a small amount of a conventional photoinitiator such as Michler's ketone, a benzoin ether, or benzophenone.

The monomers included herein are of commercial purity; that is, they may contain small amounts of other materials. For example, hydroxyethyl methacrylate (ethylene glycol monomethacrylate) normally contains small amounts of the dimethacrylate. This may even be an advantage, since, as noted above, small amounts of polyunsaturated crosslinkers are often useful.

Typical analyses of hydroxyethyl methacrylate (HEMA) and hydroxypropyl methacrylate (HPMA) show that normally the products contain small amounts of methacrylic acid, hydroxyalkoxyalkyl methacrylate, and dimethacrylates (ethylene dimethacrylate in HEMA and propylene dimethacrylate in HPMA). Typical analyses (not specifications) are:

| Component | HEMA | HPMA |
| --- | --- | --- |
| Hydroxyalkyl methacrylate, % | 90.0 | 92.0 |
| Higher boiling methacrylate, principally hydroxyalkoxyalkyl, % | 5.5 | 4.0 |
| Methacrylic Acid, % | 3.1 | 3.4 |
| Dimethacrylate, % | 0.9 | 0.2 |
| Water | 0.4 | 0.4 |

HPMA is a mixture in which the hydroxyalkyl methacrylate is principally 2-hydroxypropyl methacrylate, with some 1-methyl-2-hydroxyethyl methacrylate. While it can be done, it is not necessary to further purify the raw materials used to make the reactive diluents. The polymerization inhibitors usually present need not be removed.

Unless otherwise stated, all parts and percentages given herein are by weight.

EXAMPLE A

Preparation of Methacryloxyethyl Linseed Oil Fatty Acid Esters

A 5000 ml four-necked flask, equipped with a thermometer, air ebullator, mechanical stirrer, Dean-Stark trap and condenser, was charged with 1866.9 g linseed oil fatty acids (Procter and Gamble L-310, eq. wt: 267 g, 7.0 equiv.), 960.0 g hydroxyethyl methacrylate (7.0 equiv., inhibited with about 1,000 ppm of the methyl ether of hydroquinone), 6.72 g methanesulfonic acid (0.07 equiv.) 0.47 g phenothiazine, and 450 g heptane. The mixture was heated to reflux and water generated in the reaction was removed by azeotropic distillation. Upon completion of the reaction (4–5 hours), the flask was cooled to 50° C. and the catalyst was neutralized with 11.6 g of a 50% sodium hydroxide solution. Removal of the heptane in vacuo and filtration of the residue through Celite 545 afforded 2525 g of dark red product (93.3%), Brookfield Viscosity: 15 cps. at 25° C.

EXAMPLE 1

Preparation of Use of a High Solids Heat Set Lithographic Ink

A base ink vehicle solution is prepared, for convenience, by dissolving 60 parts of a hard synthetic rosin ester resin (Pentalyn ® G) in a mixture of 20 parts of Magie Oil 470 ink solvent and 20 parts of the 2-hydroxyethyl methacrylate esters of linseed oil fatty acids, as prepared in Example A, as the non-volatile reactive diluent.

A blue ink is prepared by pigmenting and formulating the above vehicle solution with aid of a Hoover Automatic Muller (Hoover Color Corporation) using 150 pounds pressure for 300 cycles. Approximately 7 parts of the following recipe are charged:

| | |
| --- | --- |
| Ink vehicle solution (60%) | 37.80 |
| Phthalocyanine blue pigment | 6.00 |
| 2-Hydroxyethyl methacrylate esters of linseed oil fatty acids | 5.66 |
| Cobalt naphthenate (6% Co) | 0.66 |
| Methyl ethyl ketone-oxime (25% in xylene) | 0.40 |
| | 50.52 |

The solids content of the ink is 83 percent by weight. If the ink is made in conventional fashion, i.e., by replacing the linseed oil fatty ester with volatile ink oil, the solids content is only 57% by weight.

Proofs of the high solids ink are made on web paper stock using a "Little Joe" Offset Color Swatching Press, Model S-77. The ink exhibits excellent wetting and transfer. The proofs are dried in a laboratory heat set oven ("Sinvatrol" Tester, Sinclair & Valentine Co.), at speeds up to 50 feet per minute at an air temperature of 300° F. The proofs dry to a non-offsetting condition, and cure to yield films having excellent rub resistance. They also exhibit excellent gloss and tint strength, indicative of good pigment wetting and hold-out on the paper. Moreover, the wet ink exhibits excellent storage stability.

Pentalyn ® G (Hercules Incorporated), is a dibasic acid modified rosin ester having an estimated softening point of 126° C. by ASTM ring-and-ball method E28-67, an acid number of 14, and a specific gravity of 1.10 at 25° C.

Magie Oil 470 is a heat set ink hydrocarbon solvent having the following characteristics: specific gravity, 0.8076; refractive index, 1.4483; flash point, 230° F.; K.B. No. 26.9; aniline point, 170° F.; aromatics, 10%; olefins, 5%; liquid paraffins, 85%; molecular weight (UOP 375-59), 205; initial/50%/final boiling points, 470° F./485° F./515° F.

EXAMPLE 2

Example 1 is repeated using an aliphatic hydrocarbon ink resin in place of the rosin ester resin. The resin used in this example is a polymeric hydrocarbon resin having a ring-and-ball softening point of 165° C., an acid number of less than 1, a saponification number of less than 2, a bromine number of 21.5, and an iodine number of 113. It has a specific gravity of 1.05 at 25° C., a flash point exceeding 229° C., and a melt viscosity of 10/100/1000 poise at 237° C./208° C./189° C. respectively (available as Piccovar ® AB-165, Hercules Incorporated). Essentially identical results to those of Example 1 are obtained.

EXAMPLES 3–9

In order to evaluate other compounds, the methacryloxyethyl esters (Exs 3–7) and acryloxyethyl esters (Exs 8 and 9) of the acids in the following table were prepared in a manner similar to Example A. Cobalt naphthenate, 0.06% cobalt based on the weight of the ester, was added, and 6 g of the liquid was stored in the dark in an aluminum dish having a diameter of about two inches (5 cm), and exposed to the air at room temperature (about 22°±2° C.). The materials were examined periodically. The time for development of a "skin" on the liquid sample is an indicia of the rate of cure the material would have in a formulated ink.

| Example | Fatty Acid Ester | Skinned After |
| --- | --- | --- |
| 3 | Oleate (containing about 3% linoleate) | (None after 72 hours)* |
| 4 | Tall oil | 22 hours |
| 5 | Soybean oil | 22 hours |
| 6 | Dehydrated castor oil | 16–18 hours |
| 7 | Linseed oil | 6–8 hours |
| 8 | Oleate (containing about 3% linoleate) | (none after 72 hours)* |
| 9 | Linseed oil | 6–8 hours |

*When examined three weeks later, the materials had cured throughout to form a hard film. This illustrates that even a minor amount of polyunsaturated ester is effective to induce complete curing. As indicated elsewhere herein, if the fatty acids comprise polyunsaturated ones, the peroxides formed initiate addition polymerization of the $CH_2=C<$ groups of the mixed esters of the oleates, stearates, palmitates, when such groups are present in the reactive diluents.

When examined three weeks later, the materials had cured throughout to form a hard film. This illustrates that even a minor amount of polyunsaturated ester is effective to induce complete curing. As indicated elsewhere herein, if the fatty acids comprise polyunsaturated ones, the peroxides formed initiate addition polymerization of the $CH_2=C\leqq$ groups of the mixed esters of the oleates, stearates, palmitates, when such groups are present in the reactive diluents.

A mixture of the methacryloxyethyl esters of stearic and palmitic acids is solid, but if liquefied, would no doubt act similarly to the oleates.

We claim:

1. The method of printing by lithography comprising the steps of applying a printing ink containing a colorant a binder resin and a reactive diluent to a lithographic printing plate, transferring the ink to the substrate being printed, and curing the transferred ink, the improvement in which the diluent comprises an oxidatively curable compound of the formula $$CH_2=\underset{R^1}{\overset{|}{C}}-\overset{O}{\overset{\|}{C}}-X-\overset{O}{\overset{\|}{C}}-R^2$$

wherein
—$R^1$ is —H or —$CH_3$
$R^2$ is an aliphatic radical having 11-23 carbon atoms and containing at least one olefinic double bond, or mixtures thereof, $R^2$ being free of terminal double bonds, and
—X— is either —$OR^3O$— in which $R^3$ is an aliphatic or cycloaliphatic hydrocarbon residue containing from 2 to 10 carbon atoms, or —$O(CH_2CHR^4O)_n$— where $R^4$ is —H or —$CH_3$ and n is an integer of from 2-10, or mixtures therof.

2. The method of claim 1 in which at least a part of —$R^2$ is polyunsaturated, and —X— is —$OR^3O$—, wherein $R^3$ is

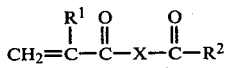

3. The method of claim 2 in which $R^3$ is —$CH_2$—$CH_2$—, —$R^1$ is —$CH_3$, and —$R^2$ is linear hydrocarbyl, is predominantly polyunsaturated, and is a mixture of moieties derived from at least one drying oil.

4. The method of claim 3 in which the ratio of colorant:binder resin plus reactive diluent is between 0.01:1 and 2:1.

5. The method of claim 4 in which the reactive diluent is present in the ink in an amount between 5% and 50% based on the combined weight of the binder resin and reactive diluent.

6. The method of claim 2 in which $R^3$ is —$CH_2CH_2$—, —$R^1$ is —H, and $R^2$ is linear hydrocarbyl, is predominantly unsaturated, and is a mixture of moieties derived from at least one drying oil.

7. The method of claim 6 in which the reactive diluent is present in the ink in an amount between 5% and 50% based on the combined weight of the binder resin and reactive diluent.

8. The method of claim 7 in which the ratio of colorant:binder resin plus reactive diluent is between 0.01:1 and 2:1.

9. The method of printing by lithography comprising the steps of applying a printing ink containing a colorant, a binder resin, and a reactive diluent, the improvement in which the reactive diluent comprises esters of drying oil fatty acids comprising a polyunsaturated drying oil acid with an addition polymerizable olefinically unsaturated hydroxyl-containing compound, transferring the ink to the substrate being printed, and curing the transferred ink.

10. The method of printing comprising the step of applying an ink containing a colorant, a binder resin, and a reactive diluent, the improvement in which the reactive diluent contains the mixed esters of (1) drying oil fatty acids, and (2) an α,β-ethylenically unsaturated carboxylic acid with a polyol, transferring the ink from the device to a substrate, and curing the transferred ink.

11. The method of claim 10 to a substrate applying the ink to a printing device, in which the drying oil acids are selected from the group consisting of tung oil acids, linseed oil acids, safflower oil acids, soybean oil acids, dehydrated castor oil acids, and mixtures thereof, transferring the ink from the device to a substrate, and curing the transferred ink.

12. The method of claim 9 in which the hydroxy-containing compound is a hydroxyalkyl ester of an α,β-ethylenically unsaturated addition polymerizable monocarboxylic or polycarboxylic acid, a hydroxyalkyl vinyl sulfide or hydroxyalkyl vinyl ether.

13. The method of claim 12 wherein the hydroxy-containing compound is a hydroxyalkyl ester of an alpha,beta-ethylenically unsaturated carboxylic acid.

* * * * *

UNITED STATES PATENT AND TRADEMARK OFFICE
CERTIFICATE OF CORRECTION

PATENT NO. : 4,253,397
DATED : March 3, 1981
INVENTOR(S) : WILLIAM D. EMMONS et al.

It is certified that error appears in the above-identified patent and that said Letters Patent are hereby corrected as shown below:

Claim 9, line 2, for "steps of applying a printing ink containing a colorant, a", change to read --steps of applying a printing ink to a lithographic printing device, said ink containing a colorant, a--.

Claim 10, line 2, change "applying an ink containing a colorant, a binder resin, and a", to read --applying an ink to a lithographic printing device, said ink containing a colorant, a binder resin and a--.

Claim 11, line 1, change "The method of claim 10 to a substrate applying the ink to a printing device, in which the drying oil acids are" to read --The method of claim 10 in which the drying oil acids are--.

Signed and Sealed this

Thirtieth Day of June 1981

[SEAL]

Attest:

RENE D. TEGTMEYER

Attesting Officer

Acting Commissioner of Patents and Trademarks